United States Patent [19]

Wittmann-Liebold et al.

[11] 4,008,736
[45] Feb. 22, 1977

[54] VALVE ARRANGEMENT FOR DISTRIBUTING FLUIDS

[76] Inventors: Brigitte Wittmann-Liebold, Meisenstrasse 17; Horst Graffunder, Lutzelsteiner Weg 52, both of 1000 Berlin 33; Heinz Kohls, Bautzener Strasse 4, 1000 Berlin 62, all of Germany

[22] Filed: Mar. 10, 1975

[21] Appl. No.: 556,855

[30] Foreign Application Priority Data

Mar. 21, 1974 Germany .......................... 2413703

[52] U.S. Cl. .............................................. 137/606
[51] Int. Cl.² ......................................... F16K 19/00
[58] Field of Search ............................ 137/606, 608

[56] References Cited
UNITED STATES PATENTS 2,954,028  9/1960  Smith .............................. 13/606 X
3,797,524  3/1974  Sanelli .............................. 137/606

*Primary Examiner*—Robert G. Nilson

[57] ABSTRACT

A valve arrangement for distributing liquid and/or gaseous substances from a plurality of substance-storing vessels to a processing vessel. The valve arrangement is characterized by an elongated conduit having an output end connectable to a receiving vessel and a plurality of openings along the length thereof the supply conduits associated with said further openings in the elongated conduit are respectively connectable to substance-storing vessels. Valves are disposed between the supply conduits and the further openings for selectively placing the respective supply conduits in fluid communication with the output end of the elongated conduit.

4 Claims, 4 Drawing Figures

VALVE ARRANGEMENT FOR DISTRIBUTING FLUIDS

BACKGROUND OF THE INVENTION

This invention is directed to a valve arrangement for selectively distributing fluids from a plurality of supply vessels to a receiving vessel, and in particular to a valve arrangement of the type utilized in chemical apparatus such as a protein sequenator, for effecting selective conveyance and distribution of liquid or gaseous substances from a plurality of substance-storing vessels to a processing vessel. In such conveyance and distribution devices, the successful operation thereof depends on the efficiency with which the substances are completely distributed into the processing vessel.

Accordingly, residues remaining in the dosage lines leading from the shutoff valves to the processing vessel, and the possibility caused by leaky shutoff valves of reagent being distributed to the processing vessel at the wrong time diminish the quantity of the dosage supplied, or become contaminants during successive operations of the valve arrangement. For example, in certain well known protein sequenators either the dosage lines are not washable or they are not easily evacuated (Biocal sequenator), or in the alternative, the dosage lines and/or shuttle valves have sufficient clearance volumes (Beckman-Squenzer) whereby the residues of the substances continually build up. The removal of such reagent residues in the dosage lines and shutoff valves can be achieved by utilizing solvents to wash same, but such washing is less than completely satisfactory due to the requirement of a large quantity of solvents to effect such washing out and the unwanted reactions effected thereby in the processing vessel during successive processing steps.

SUMMARY OF THE INVENTION

Generally speaking, in accordance with the invention, a valve arrangement adapted to selectively distribute fluids from at least two supply vessels to a receiving vessel is provided. The valve arrangement includes at least two supply conduits, each of the supply conduits being connectable to a supply vessel. An elongated conduit having an output end is connectable to a receiving vessel, and defines at least two further openings along the length thereof. Valves are respectively disposed between the supply conduits and the further openings for selectively placing the respective supply conduits in fluid communication with the output end of the elongated conduit. Accordingly, it is an object of this invention to provide an improved valve arrangement for the distribution and conveyance of liquid or gaseous substances to a processing vessel.

Another object of the present invention is to provide a valve arrangement wherein the clearance volumes between the dosage devices and the processing vessel are eliminated.

Still another object of this invention is to provide an improved valve arrangement wherein the dosage lines between the dosage device and the processing vessel are capable of being completely emptied and cleaned after each operation thereof, without detrimental effect to the next subsequent operation thereof.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 2:
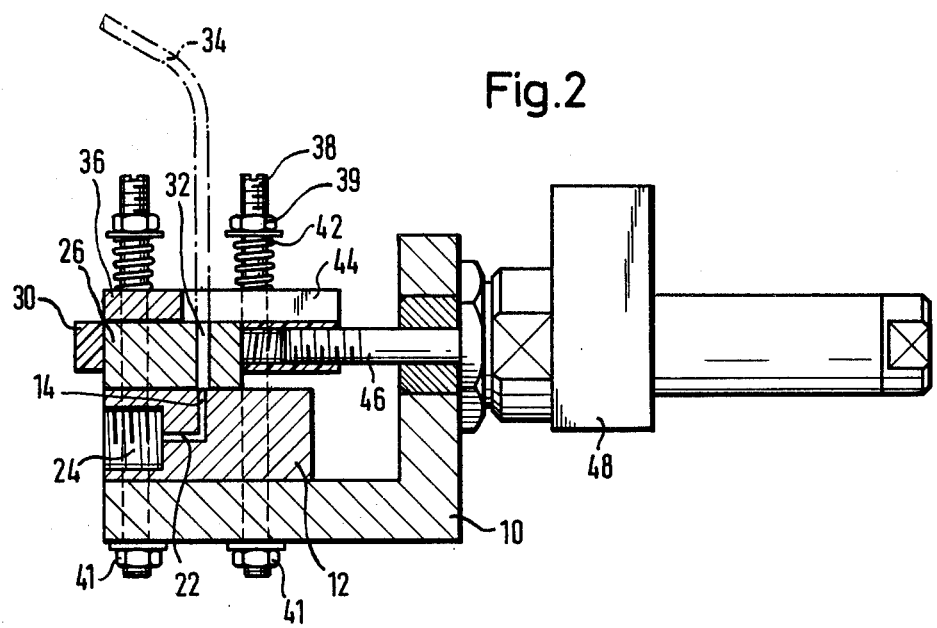
FIG. 2 is a sectional view taken along line II—II of FIG. 1.
Figure 1:
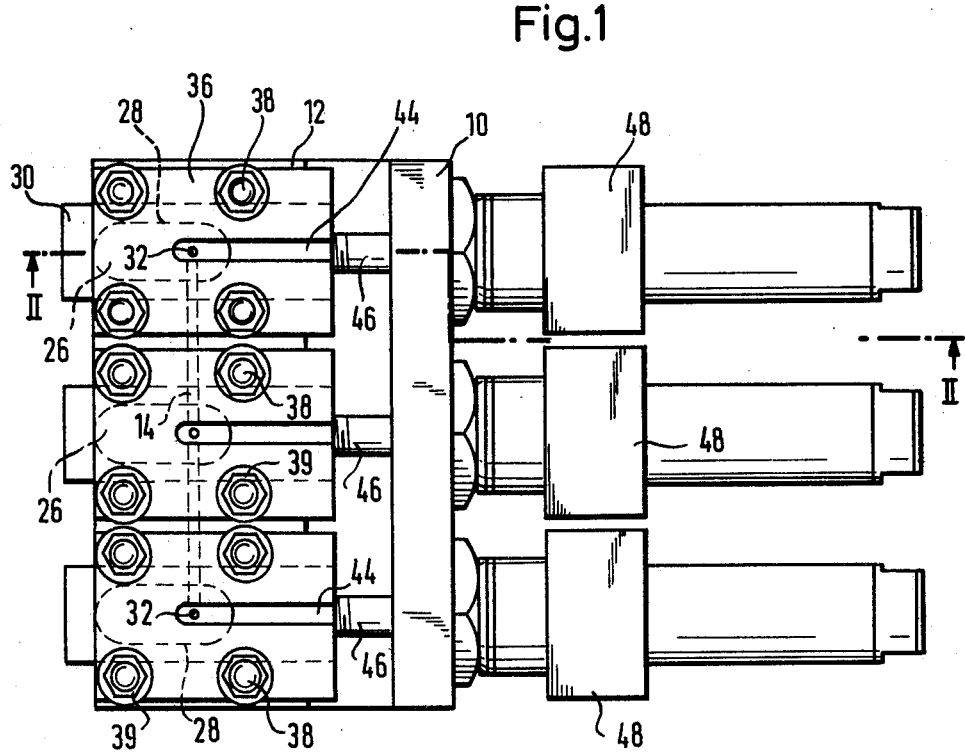
FIG. 1 is a plan view of a three-valve arrangement constructed in accordance with the instant invention.

Reference is now made to FIGS. 1 and 2 wherein a three shutoff valve arrangement constructed in accordance with the instant invention is depicted. An angle mount 10 supports a common conduit block 12 that contains a single elongated capillary tube 14 for providing a single common conduit.

Figure 3:
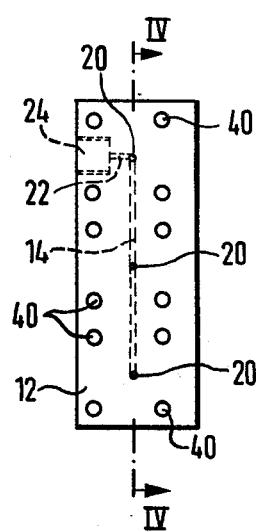
FIG. 3 is a plan view of a block housing an elongated conduit in accordance with the instant invention.
Figure 4:
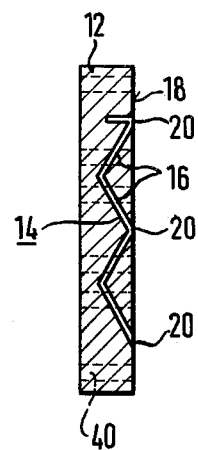
FIG. 4 is a sectional view taken along line IV—IV in FIG. 3.

Reference is made to FIG. 4 wherein the elongated zig-zag shaped capillary tube 14 is depicted. The capillary tube 14 is comprised of individual capillary segments 16 that are bored at an angle of 30° against the contact surface 18 in the block 12. The cutaway portions of the capillary segments at the contact surface 18 of the block define junction openings 20 in the capillary tube for alignment with the shutoff valves in a manner to be discussed in greater detail below. Accordingly, the capillary tube is arranged so that capillary segments 18 coincide in a crest on the contact surface 18 to define the junction openings 20. An output end 22 of the capillary tube 14 discharges into a bore hole 24, as is more specifically depicted in FIG. 3, which bore hole 24 defines the mounting for mounting the valve arrangement to a processing vessel (not shown).

The respective shutoff valves are defined by oval guide shoes 26 positioned to cover junction openings 20 in contact surface 18 of the common conduit block 12, the common conduit block 12 being disposed in transverse relationship with respect to the valves to be utilized therewith. A feed gate 30 has an oval aperture 28 therein. The guide shoes 26 are disposed in the oval openings 28 in interfitting relationship therewith. Each guide shoe defines a conduit 32 for disposing a plurality of supply conduits in the form of a rubber hose 34 in fluid communication with junction openings 20 in the common conduit block 12. The surface of the guide shoe in contact with the contact surface 18 of the common conduit block 12 is ground smooth in order to allow same to be slidably disposed with respect to the contact surface 18. The conduits 32 in the guide shoes are thereby adapted to be aligned with the junction openings 20 in the common conduit block 12 when the shutoff valves are in open position, and are adapted to be out of alignment hence causing the guide shoe to cover the junction openings 20 when the shutoff valves are in a closed position.

Vacuum-type shutoff valves are provided by utilizing a pressure plate 36 to force the guide shoes 26 into pressure contact with the contact surface 18 of the common conduit block. In order to provide such force, the pressure plate 36 sandwiches the common conduit block 12 and guide shoes 26 between same and angle bracket 10. The force is applied by means of bolts 38, having helical springs 42 wrapped therearound, and maintained in pressure contact by tightening nuts 39 and 41. Accordingly, the pressure plate 36 is provided with a slot 44 for allowing the flexible supply tubes 34 to be maintained in fluid communication and movable with the conduits in the guide shoes. Accordingly, the feed gates 30 are coupled to a slide bar 46 which slide bar is coupled to an actuating mechanism 48 adapted to be coupled to a program-controlled release device in order to provide for selective longitudinal displacement of the feed gates 30 to effect positioning of the conduit in the guide shoe into and out of alignment with the junction openings 20 in the common conduit block 12. Accordingly, selective alignment of the guide shoes 26 to thereby provide fluid communication between the supply tubes 34 and the capillary path 14 provides for the selective distribution of fluids in substance storing vessels to a processing vessel (not shown) coupled to bore hole 24.

It is noted that the three-valve arrangement of FIG. 1 is by way of example only, and that any number of valves can be utilized in accordance with the instant invention. Moreover, the instant invention contemplates the elimination of the borehole 24 and the substitution therefor of an additional valve in which the output end of the capillary tube 14 would be coupled therethrough to a processing vessel. Such an arrangement would provide for the additional valve being capable of closing off the capillary tube from the processing vessel when same is evacuated.

Moreover, when such a valve arrangement is utilized in a protein sequenator, the storage vessels are mounted to the capillary tube 14 in such a manner that the first reagent is followed by a first solvent, whereafter the cycle is repeated of a reagent and a solvent so that the solvent from the reagent can rinse the reagent residues out of the line in cyclical fashion. Thus, at the end of the storing vessels, a further storing vessel for storing a rinsing medium such as nitrogen gas, could be secured so that after each dosing procedure, the capillary tube 14 can be rinsed free from residues of reagents and solvents.

It is noted, that the valve arrangement constructed in accordance with the instant invention avoids the problem of incompletely washed dosage lines between the dosage devices and the processing vessel as well as problems which occur because of the clearance volumes in the valves. The instant invention further provides for the rinsing of the collective conduit path after each working operation instead of the cleaning of individual lines which occasions great expense to effect same.

Finally, it is noted that the valve arrangement in accordance with the instant invention provides for the type of vacuum-type valves needed in a protein sequenator by means of the pressure applied thereto by the pressure plate. By coupling the actuating means to a program-controlled actuating device, the cycle of distribution can be accurately achieved by opening and closing the shutoff valves. In addition to the tightness of the vacuum obtained, it is important to render the surfaces corrosion-resistant in selecting the materials for the common conduit block and the guide shoes. For example, the guide shoes can preferably be formed from polyfluoride ethylene as can the blocks. When metal materials are utilized specific attention must be paid to the deterioration of the very highly polished slide surfaces on the block and on the guide shoes.

It will thus be seen that the objects set forth above, among those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A valve arrangement adapted to selectively distribute fluids from a plurality of supply vessels to a receiving vessel comprising in combination at least two supply conduits, each of said supply conduits being connectable to a supply vessel, a common elongated conduit formed in a block, said block having at least one substantially flat surface, said elongated conduit having an output end connectable to a receiving vessel, said elongated conduit further including at least two further openings along the length thereof, said further openings being defined by the intersection at said surface of said block of portions of said conduit upstream and downstream of each said further opening, and at least two valve means, each said valve means being disposed at said surface of said block between a supply conduit and a further opening for selectively placing said respective supply conduits in fluid communication with the output end of said elongated conduit.

2. A valve arrangement as claimed in claim 1, wherein said common elongated conduit is disposed in zig-zag fashion throughout said common conduit block, the crest of each zig-zag defining said further openings in the block surface.

3. A valve arrangement as claimed in claim 1, each of said valve means including a guide shoe disposed intermediate said supply tubes and said further openings, said guide shoes including a first opening in fluid communication with said supply tubes, said guide shoes being displaced in a first position to maintain said supply tube in fluid communication with said respective opening, and in the second position to seal off said supply tube from said further opening associated therewith.

4. A valve arrangement as claimed in claim 3, wherein said valve means further includes feed gates adapted to selectively position said guide shoes in a first and second position, and pressure plate means adapted to force said guide shoes into contact with said common conduit block, to provide a vacuum-seal relationship therebetween.

* * * * *